United States Patent
Dellinger et al.

(10) Patent No.: US 6,556,760 B1
(45) Date of Patent: Apr. 29, 2003

(54) OPTICAL FIBER RIBBON SEPARATION TOOL

(75) Inventors: Kerry D. Dellinger, Hickory, NC (US); Carl M. Whisnant, Jr., Hickory, NC (US); Alan T. Parsons, Newton, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/386,698

(22) Filed: Aug. 31, 1999

(51) Int. Cl.[7] .................................................. G02B 6/00
(52) U.S. Cl. ........................ 385/134; 385/135; 385/147; 30/90.4
(58) Field of Search ................................. 385/134, 135; 83/440, 440.1, 441, 444, 448, 516, 517, 530, 563, 566, 567, 569, 588, 590, 618, 619, 632, 648, 874, 924, 945, 953; 269/44, 43, 900, 909; 81/9.4; 30/90.1–90.9, 91.1, 91.2

(56) References Cited

U.S. PATENT DOCUMENTS

| | | | |
|---|---|---|---|
| 2,435,660 A | 2/1948 | Tileston | 164/39 |
| 3,314,321 A | 4/1967 | Fauconniere | 83/1 |

(List continued on next page.)

FOREIGN PATENT DOCUMENTS

| | | | | |
|---|---|---|---|---|
| CA | 2251508 | 5/1999 | ............ | G02B/6/25 |
| EP | 0794447 A1 | 9/1997 | ............ | G02B/6/44 |
| WO | WO 98/57210 | 12/1998 | ............ | G02B/6/44 |

OTHER PUBLICATIONS

Patent Abstract of Japan, JP 02 153305, Jun. 13, 1990.
Patent Abstract of Japan, JP 03 213804, Sep. 19, 1991.
Patent Abstract of Japan; 02153305; Jun. 13, 1990.
Patent Abstract of Japan; 08075929; Mar. 22, 1996.
Patent Abstract of Japan; 03213804; Sep. 19, 1991.

*Primary Examiner*—Akm E. Ullah
*Assistant Examiner*—Michelle R. Connelly-Cushwa (57) ABSTRACT

A ribbon separation tool (10) for separating optical fiber ribbons (C1,C2,C3) into subsets of optical fibers. Ribbon separation tool (10) includes a stationary shearing device (70), and a moveable shearing device (50), the moveable shearing device (50) is operative to move relative to the stationary shearing device (70) during a shearing stroke. Optical fiber ribbon support elements (42), with optical fiber ribbon receiving slots (46) being defined therebetween, are adjacent shearing devices (50,70). Moveable shearing device (50) is moveably located between optical fiber ribbon support elements (42) and includes moveable sub-slots (51,52). When a cover member (60) of tool (10) is in a closed position, stationary sub-slots (71,72) of stationary shearing device (70) are aligned with moveable sub-slots (51,52) to define shearing slots (51,71;52,72). Shearing slots (51,71;52,72) are each sized to receive a respective optical fiber ribbon (C1,C2,C3), and each shearing slot straddles a shearing plane (M) defined between shearing devices (17, 27). At least one shearing device (50,70) is monolithically formed of a single piece of material.

19 Claims, 11 Drawing Sheets

U.S. PATENT DOCUMENTS

| | | | |
|---|---|---|---|
| 3,575,329 A | 4/1971 | Hannabery | 225/97 |
| 3,709,081 A | 1/1973 | Rush | 83/411 |
| 4,046,045 A | 9/1977 | Stevens | 83/620 |
| 4,179,964 A | 12/1979 | Kirkgasser et al. | 83/599 |
| 4,230,008 A | 10/1980 | Fornwalt et al. | 83/456 |
| 4,589,319 A | 5/1986 | Litehizer, Jr. | 83/423 |
| 4,608,895 A | 9/1986 | Bell et al. | 83/345 |
| 4,979,413 A | 12/1990 | Beller | 83/444 |
| 5,093,992 A | 3/1992 | Temple, Jr. et al. | 30/90.8 |
| 5,107,735 A | 4/1992 | Ramun et al. | 83/407 |
| 5,443,536 A * | 8/1995 | Kiritsy et al. | 30/90.8 |
| 5,457,762 A | 10/1995 | Lochkovic et al. | 385/114 |
| 5,524,166 A | 6/1996 | Osaka et al. | 385/134 |
| 5,561,730 A | 10/1996 | Lochkovic et al. | 385/114 |
| 5,584,845 A | 12/1996 | Hart | 606/174 |
| 5,685,945 A | 11/1997 | Mock et al. | 156/584 |
| 5,806,394 A | 9/1998 | Marocco | 83/197 |
| 5,856,383 A * | 1/1999 | Wu et al. | 523/429 |
| 5,926,598 A | 7/1999 | Klein | 385/137 |
| 5,944,949 A * | 8/1999 | Mock | 156/584 |
| 6,012,357 A * | 1/2000 | John | 81/9.44 |
| 6,023,844 A * | 2/2000 | Hinson, II et al. | 30/90.8 |
| 6,053,085 A * | 4/2000 | Lochkovic et al. | 83/618 |
| 6,079,297 A * | 6/2000 | Chandler et al. | 81/9.51 |
| 6,115,527 A | 9/2000 | Lochkovic et al. | 385/134 |

* cited by examiner

OPTICAL FIBER RIBBON SEPARATION TOOL

FIELD OF THE INVENTION

The present invention is directed to a tool for use in the preparation of optical fibers for connectorization, and, more particularly, to a ribbon separation tool for separating one or more optical fiber ribbons into subsets of optical fibers.

BACKGROUND OF THE INVENTION

Figure 1:
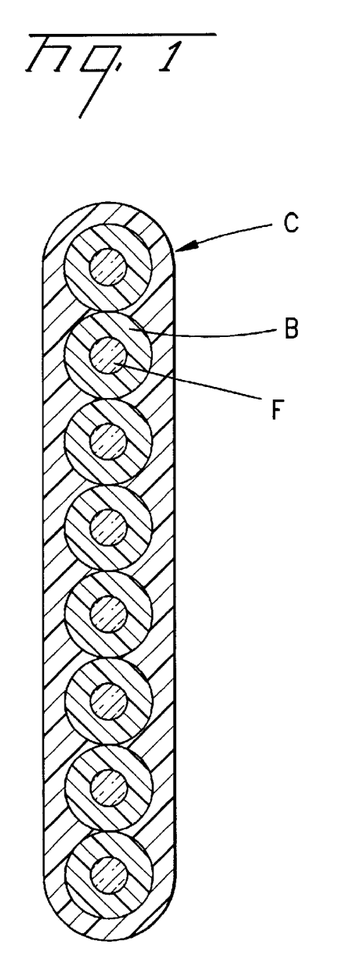
FIG. 1 is a cross sectional view of a conventional optical fiber ribbon having eight optical fibers.

A fiber optic cable may include one or more optical fiber ribbons capable of transmitting voice, television, or computer data information. Examples of optical fiber ribbons are disclosed in U.S. Pat. Nos. 5,561,730 and 5,457,762, which are incorporated herein by reference. Optical fiber ribbons may be made by arranging a plurality of optical fibers in planar relationship, and then extruding a common matrix coating, such as a UV curable acrylate material, about the optical fibers. FIG. 1 is an enlarged cross sectional view of a conventional optical fiber ribbon C with eight optical fibers F, each fiber having a respective buffer layer B. Conventional optical fiber ribbons C may or may not have spaces between adjacent buffer layers B. Often the connectorization of optical fibers F requires ribbon C to be separated into optical fiber subsets. The respective ends of the subsets are then stripped of the common matrix coating, and buffer layers B are removed thereby exposing the optical fibers. The optical fibers are then ready for connectorization.

Figure 2:
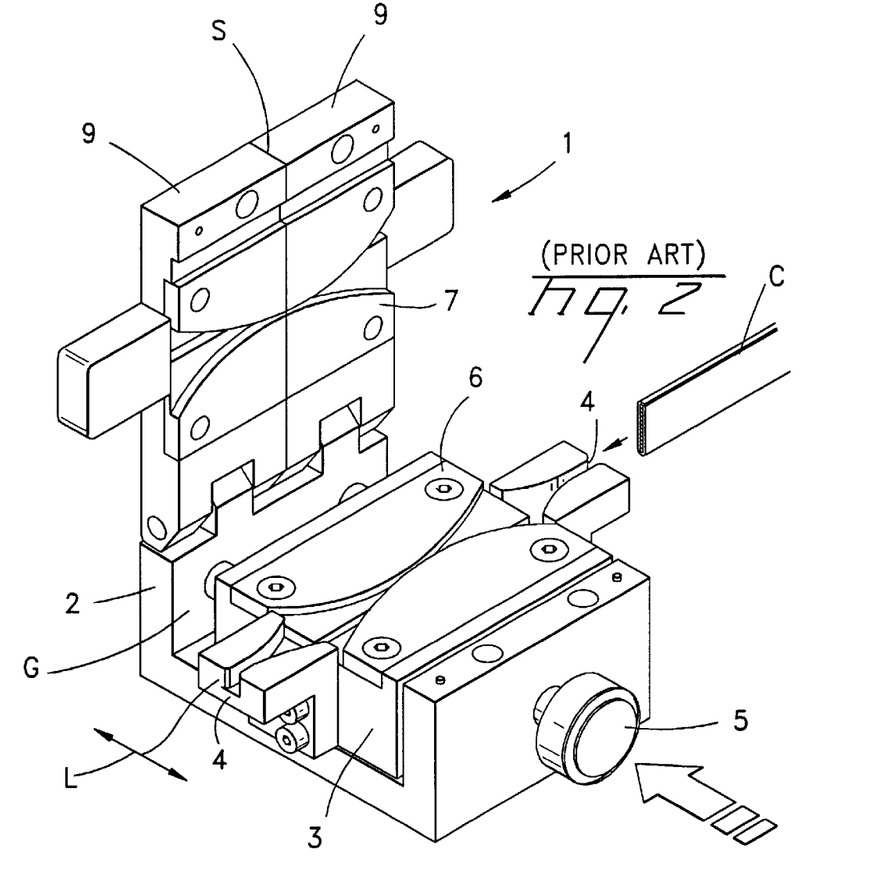
FIG. 2 is an isometric view of a known optical fiber ribbon separation tool for separating a single optical fiber ribbon into optical fiber subsets.
Figure 3:
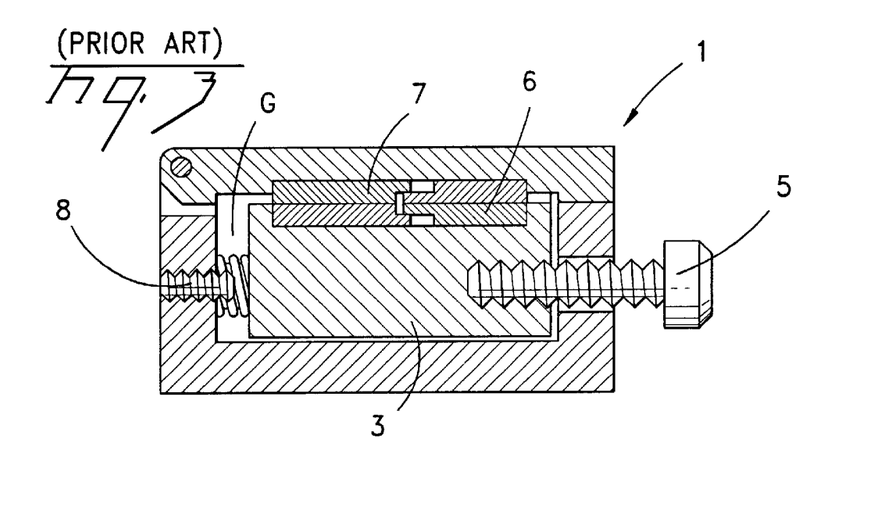
FIG. 3 is a cross sectional view of the known ribbon separation tool of FIG. 2.

FIGS. 2 and 3 illustrate a known, all-metallic ribbon separation tool 1 used for separating a single optical fiber ribbon into optical fiber subsets. Ribbon separation tool 1 comprises a housing 2 mounting a reciprocal member 3 formed of many parts. Reciprocal member 3 is moveable along a line of action L when a pressing force is applied to a button 5. Ribbon receiving slots 4 are arranged to receive a single optical fiber ribbon C. Reciprocal member 3 includes blades 6 fastened thereto, which blades are designed to shear optical fiber ribbon C in a shearing stroke of reciprocal member 3. Cooperating with and hingedly mounted to the housing base is a pair of cover members 9 that are separated by a slit S. Each cover member 9 includes respective shearing blades 7 that cooperate with blades 6 to effect shearing of optical fiber ribbon C. Maintaining pressure on button 5, and at the same time pulling sheared optical fiber ribbon C to its end, results in a lengthwise separation of optical fiber ribbon C into two optical fiber subsets. Each of the two subsets has a number of optical fibers therein, for example, the two subsets include six fibers each. As best seen in FIG. 3, the length of the shearing stroke of reciprocal member 3 is adjustable by manipulating a screw 8 with a special tool, e.g., an Allen wrench.

Known ribbon separation tool 1 has several disadvantages. First, it is limited to separating but a single optical fiber ribbon C per shearing stroke, such that plural ribbons may only be separated in a time-consuming series of shearing strokes. In addition, only two subsets of optical fibers can be made by blades 6,7 per shearing stroke; if numerically different subsets of optical fibers are needed, blades 6,7 must be replaced with different sized blades that will result in numerically different subsets of optical fibers. Replacing blades 6,7 is a time consuming procedure; moreover, an expensive inventory of different sized blades 6,7 must be maintained. This is disadvantageous because making such an adjustment is a time-consuming procedure, and because a craftsman must keep such a special tool on hand to make the adjustments as needed. Furthermore, gap G, that exists between reciprocal member 3 and housing 2 and which allows space for the shearing stroke of reciprocal member 3, is exposed to the outside environment of ribbon separation tool 1. Such exposure is a problem because foreign matter may enter gap G and decrease or altogether block movement of reciprocal member 3 along its line of action L, thereby resulting in an incomplete or a non-shearing of optical fiber ribbon C. Additionally, as cover members 9 and blades 7 are separated at line S, the covers 9 may move independently of each other; consequently, blades 7 may be misaligned during the shearing stroke, possibly causing damage to optical fiber ribbon C and optical fibers F. Moreover, the shearing devices require many parts, some of which are machined metal parts, the manufacture and assembly of which is expensive and time-consuming.

An optical fiber ribbon break out tool is disclosed in U.S. Pat No. 5,926,598. The break out tool has die members formed of an aluminum material having slots with respective taperless, right-angle corners. The die members include keys that interfit with a frame. The frame has no distinct guide members for guiding the optical ribbons during the break out procedure. An alternative embodiment requires grooves cut in a stationary die that receive projections of a movable die during the ribbon break out procedure. This ribbon break out apparatus has several disadvantages. For example, the absence of a cover can subject the dies to the intrusion of foreign matter, and the aluminum material is generally not a high quality tool-grade material. The affect of the absence of guide members and/or the taperless right-angle corners on the optical ribbon during the break out procedure can result in stray fibers, fiber breakage, and/or matrix material damage including delamination of the matrix from the optical fibers.

SUMMARY OF THE INVENTION

In one aspect the invention provides a ribbon separation tool, comprising at least two shearing devices, at least one of the shearing devices being a movable shearing device operative to move in a shearing stroke relative to the other of the shearing devices; the shearing devices cooperating to define at least one shearing station comprising a shearing slot; the shearing slot comprising at least one shearing edge profile, the shearing edge profile comprising generally straight edges that approximate an arc.

In another aspect the invention provides a ribbon separation tool, comprising at least two shearing devices, at least one of the shearing devices being a movable shearing device operative to move in a shearing stroke relative to the other of the shearing devices, and at least one of the shearing devices being monolithically formed of a single piece of material; the shearing devices defining at least one shearing station comprising a respective shearing slot, at least part of the shearing slot being formed in the at least one monolithically formed shearing device, and the shearing slot comprising at least one shearing edge profile, the shearing edge profile comprising an arcuate shearing edge.

In another aspect the invention provides a ribbon separation tool, comprising at least one slot having generally parallel cutting edges for receiving an optical fiber ribbon therebetween; and guide members adjacent the slot for aligning the optical fiber ribbon with respect to the slot.

In another aspect the invention provides a method for making a shearing device for a ribbon separation tool, the method comprising the steps of: (a) burning a first blank with an electrode so that at least one shearing slot comprising a shearing edge profile is formed in the blank; and (b) adjusting the position of the electrode so that the electrode burns at least one shearing slot comprising a shearing edge profile into a second blank located adjacent the first blank.

In another aspect the invention provides a method for making a shearing device for a ribbon separation tool, the method comprising the step of: shaping a sinker electrode into a replica of two opposing shearing edge profiles; and applying the sinker electrode to a blank and burning the shearing edge profiles into the blank.

In another aspect the invention provides a method for making a shearing device for a ribbon separation tool, the method comprising the step of: introducing a moldable material into a mold and forming a shearing device having at least one shearing edge profile.

DETAILED DESCRIPTION OF THE INVENTION

Figure 4:
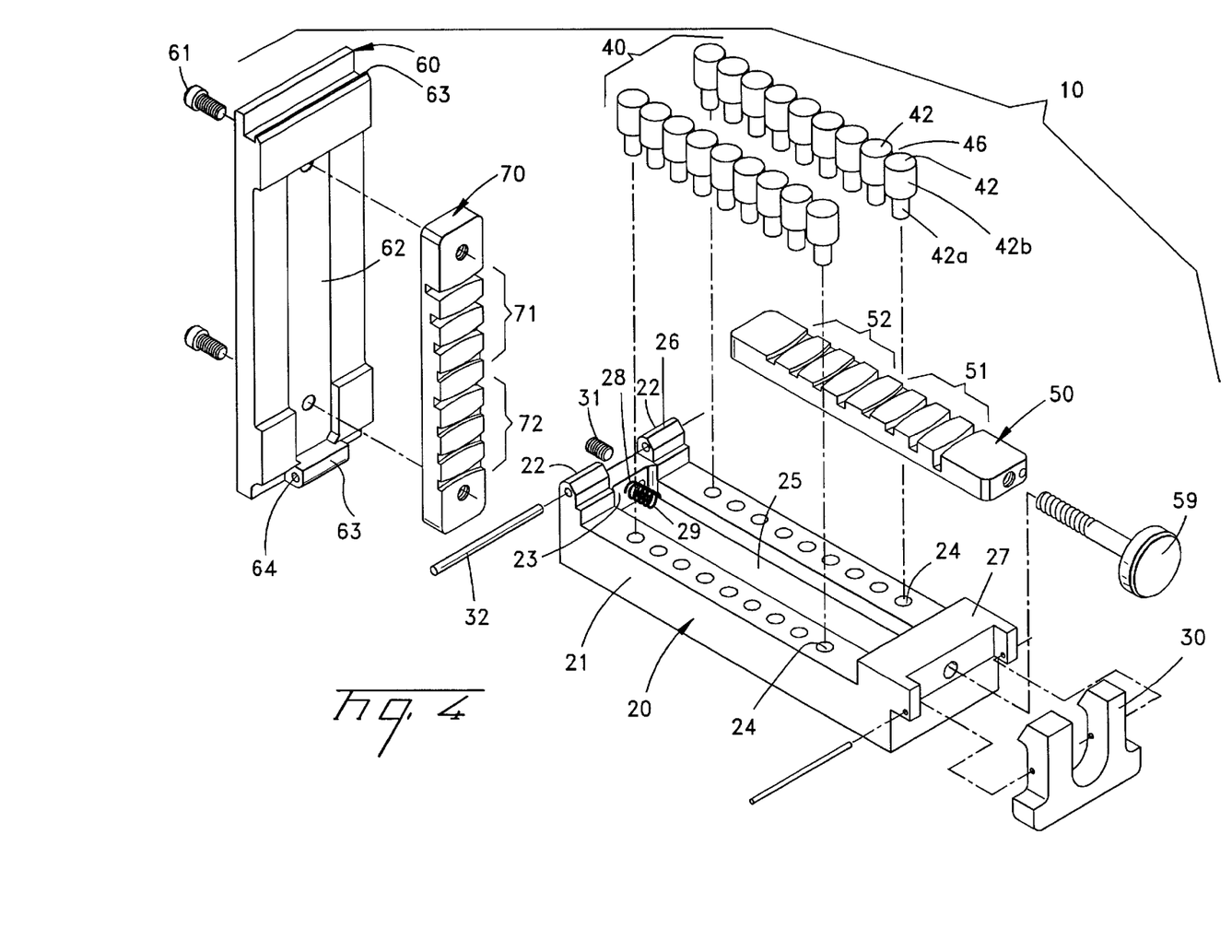
FIG. 4 is an exploded isometric view of a ribbon separation tool according to the present invention.
Figure 8:
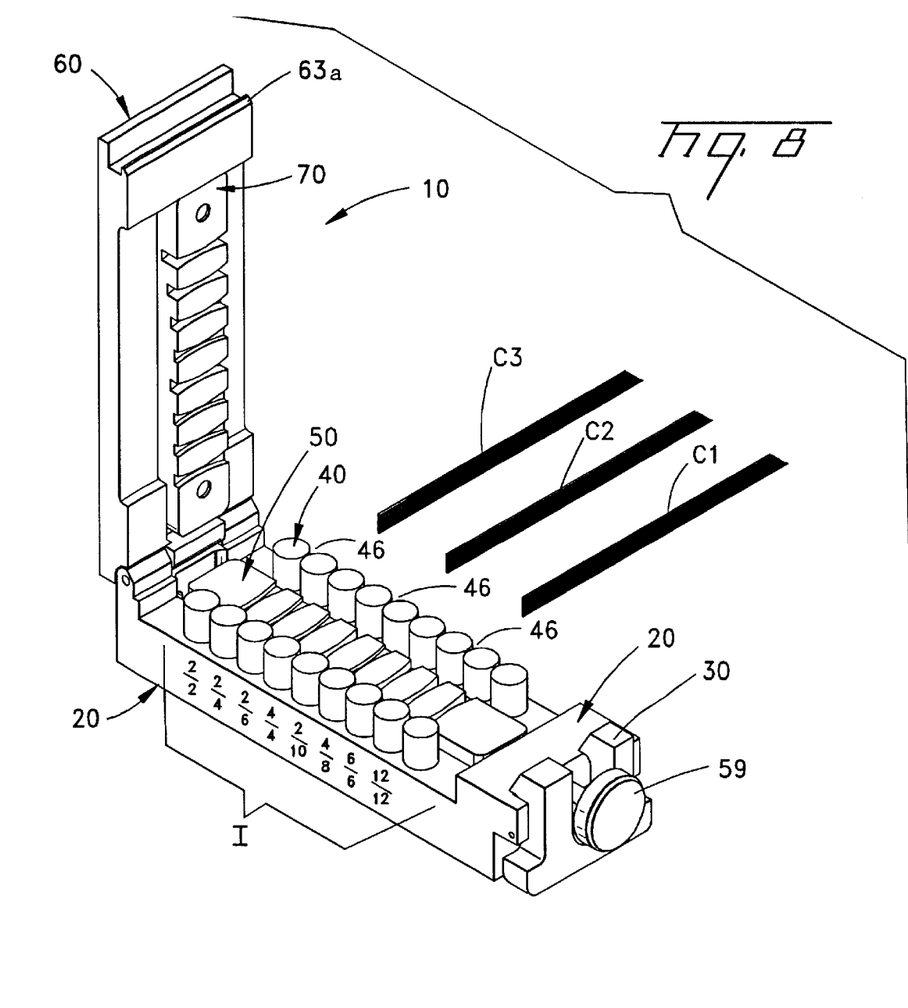
FIG. 8 is an isometric assembly view of the ribbon separation tool of FIG. 4 showing three optical fiber ribbons arranged for insertion into the ribbon separation tool.
Figure 9:
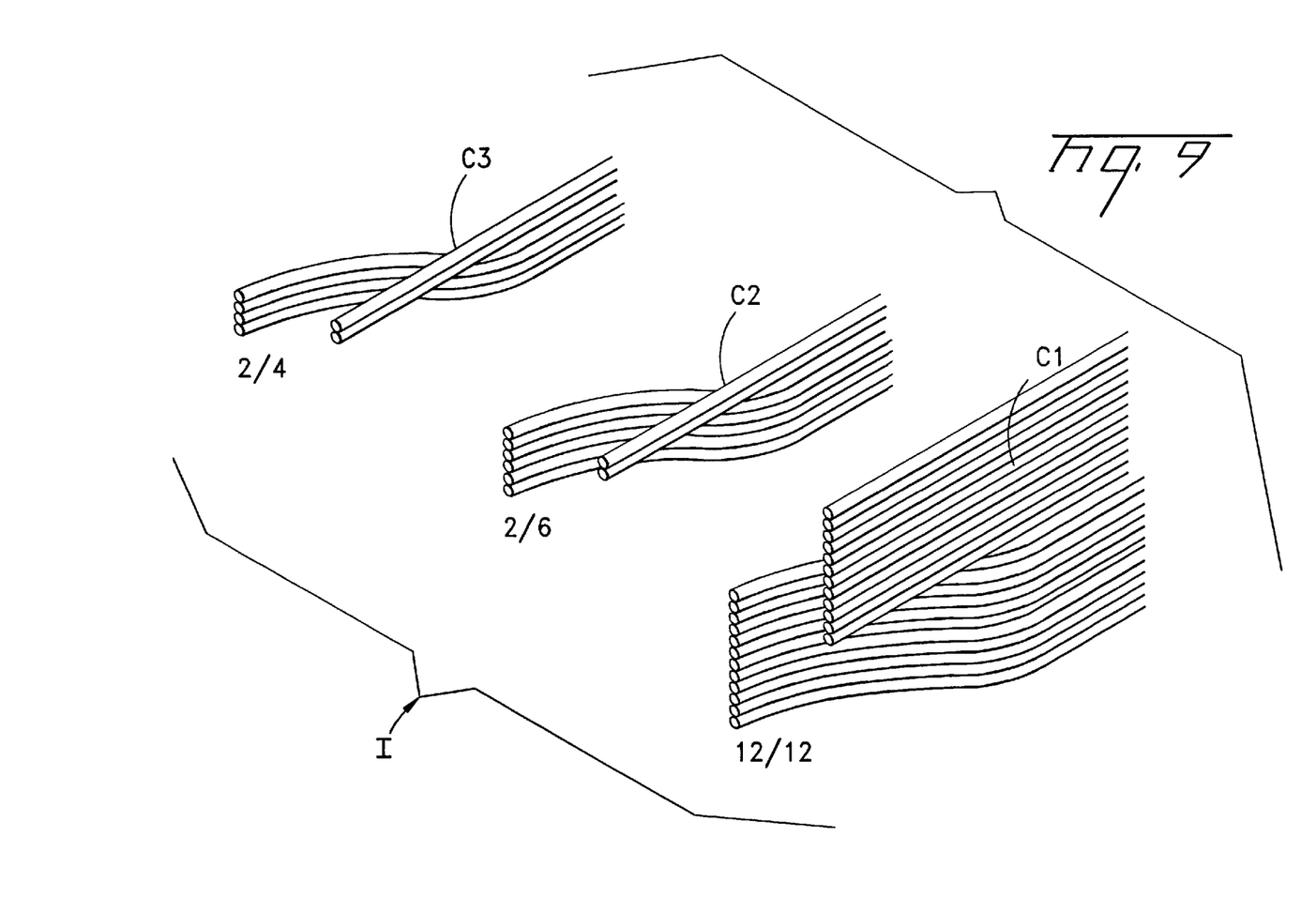
FIG. 9 is an enlarged isometric view of three optical fiber ribbons separated into optical fiber subsets with the ribbon separate tool of the present invention.
Figure 11:
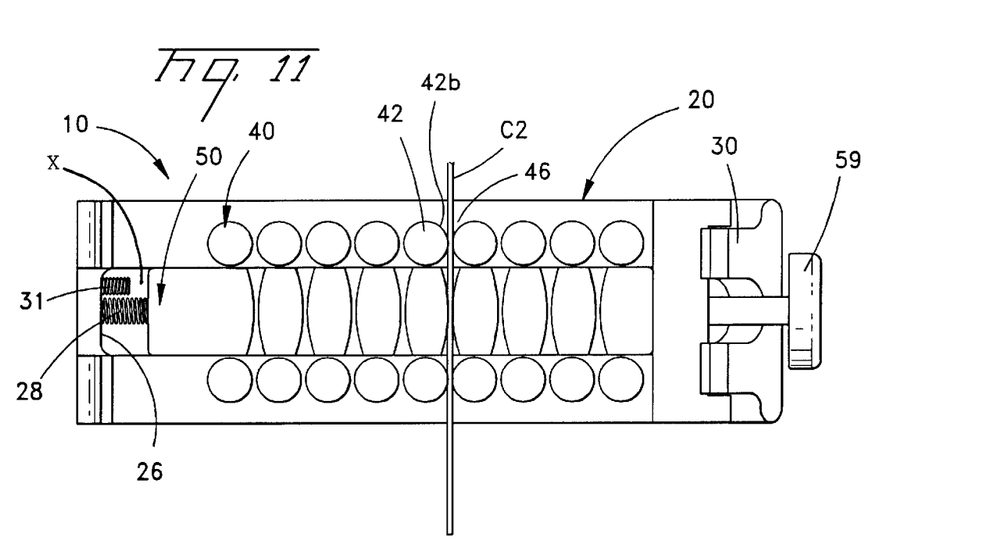
FIG. 11 is a top view of an optical fiber ribbon positioned in the ribbon separation tool of FIG. 8.
Figure 12:
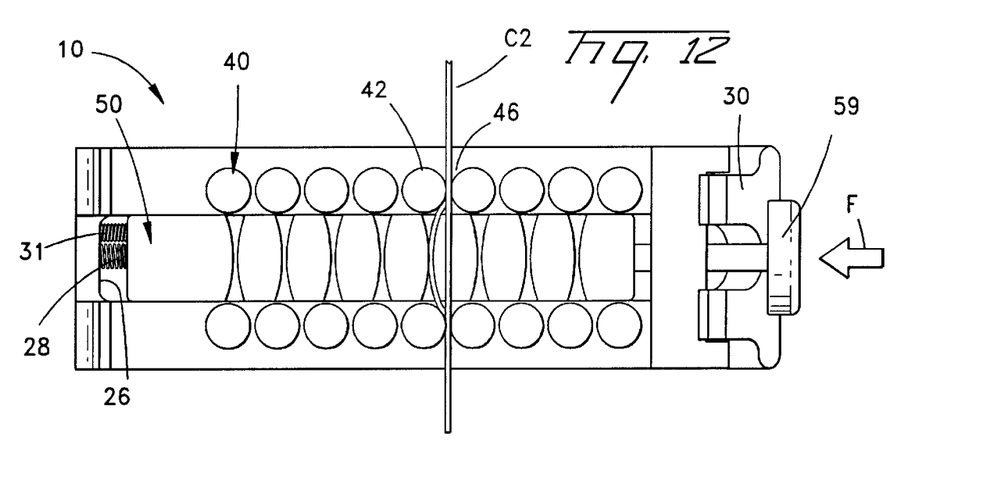
FIG. 12 top view comparable to FIG. 11 showing the optical fiber ribbon after being sheared.
Figure 14:
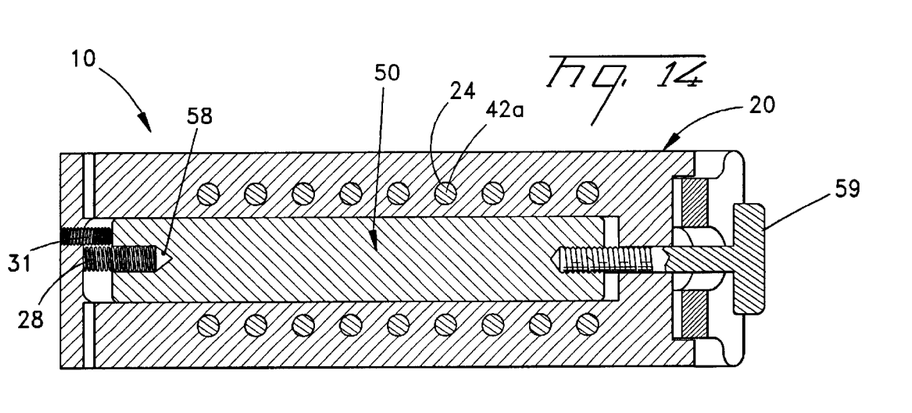
FIG. 14 a cross sectional view taken through the ribbon separation tool of the present invention, along line 14—14 of FIG. 13.

Referring to FIGS. 4–18, a ribbon separation tool 10 according to the present invention will be described. FIG. 4 is an exploded view illustrating virtually all of the component parts of ribbon separation tool 10. Ribbon separation tool 10 comprises a base 20 including a longitudinal recess 25 formed therein and a pair of end walls 26,27. Recess 25 is sized to receive a moveable shearing device 50 therein. End wall 26 includes a pair of spaced-apart shoulders 22 for slidably receiving respective rods 32 therethrough, and end wall 26 includes a threaded aperture for threadably receiving a set screw 31 therein (FIGS. 11–12 and 14). In addition, end wall 26 includes a guide pin 29 within a spring 28, and a spring interface surface 23 for assisting in the compression of spring 28 during a shearing stroke of moveable shearing device 50 (FIGS. 8–9).

Figure 13:
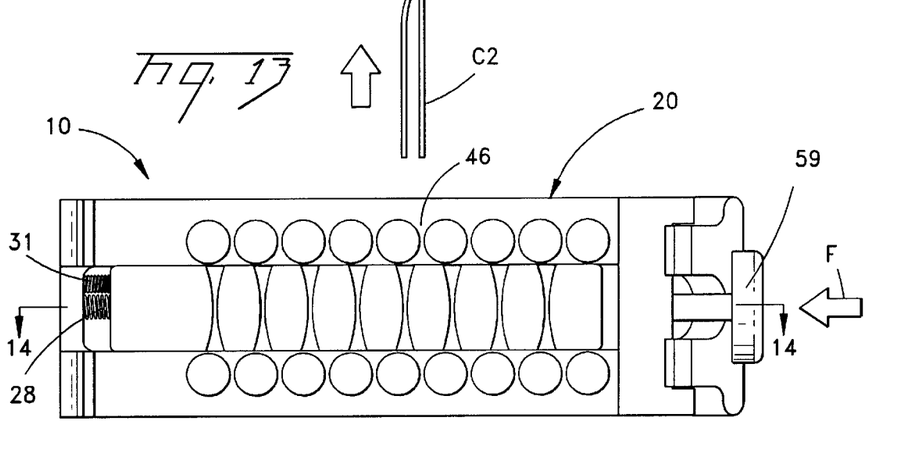
FIG. 13 a top view similar to FIG. 12 showing the optical fiber ribbon after being separated lengthwise.

Base 20 preferably includes two rows of ribbon support elements 42 that are preferably generally cylindrical in shape. Apertures 24 formed in base 20 are preferably sized to press fittingly receive respective base portions of ribbon support elements 42 along sides 21 of base 20 (FIG. 14). The press-fitting of the base portions into apertures 24 obviates the need for time-consuming threaded connections. In a preferred embodiment of the present invention, ribbon support elements 42 define respective slots 46 therebetween for respectively receiving optical fiber ribbons (FIGS. 8 and 11). Ribbon support elements 42 preferably define generally cylindrical guide surfaces for guiding the optical fiber ribbons during insertion thereof into tool 10 and pulling therethrough (FIGS. 11–13).

Referring to FIG. 4, end wall 27 includes an aperture for slidably receiving a portion of a pusher member 59 that is threadably connected to shearing device 50 (FIG. 14). In a most preferred embodiment, shearing devices 50,70 are each monolithically formed of a single piece of a durable, wear-resistant material, for example, tool-grade stainless steel, that permits the formation of sharp shearing edges thereon. Alternatively, shearing devices 50,70 can be formed of an engineering plastic that permits formation of sharp shearing edges. In the preferred embodiments, two sets of shearing sublots 51,52 and 71,72 are respectively formed in shearing devices 50,70. Additionally, shearing device 50 includes a spring retaining recess 58 that receives spring 28 therein (FIG. 14).

Figure 15:
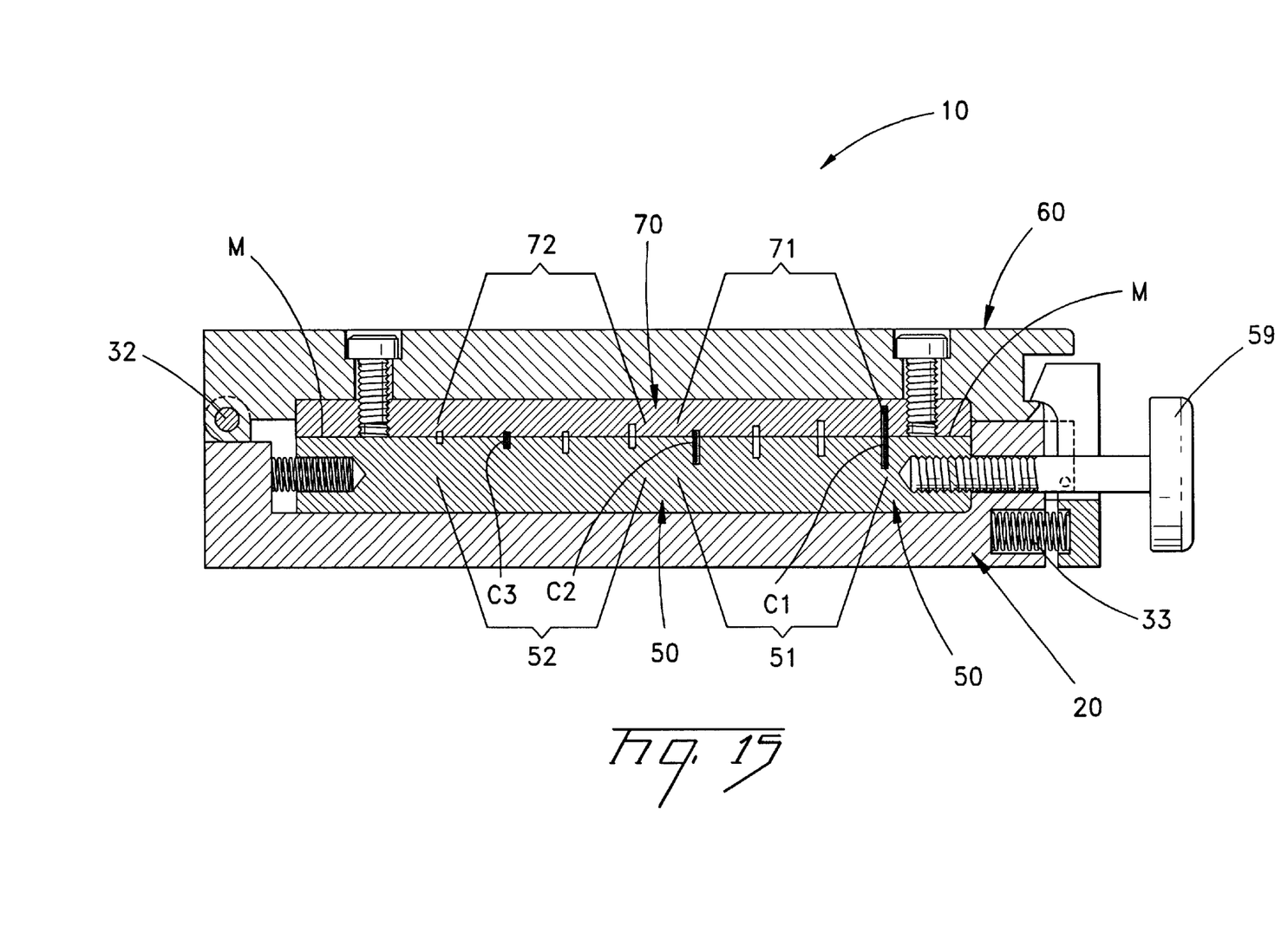
FIG. 15 is a cross sectional view of the ribbon separation tool.
Figure 16:
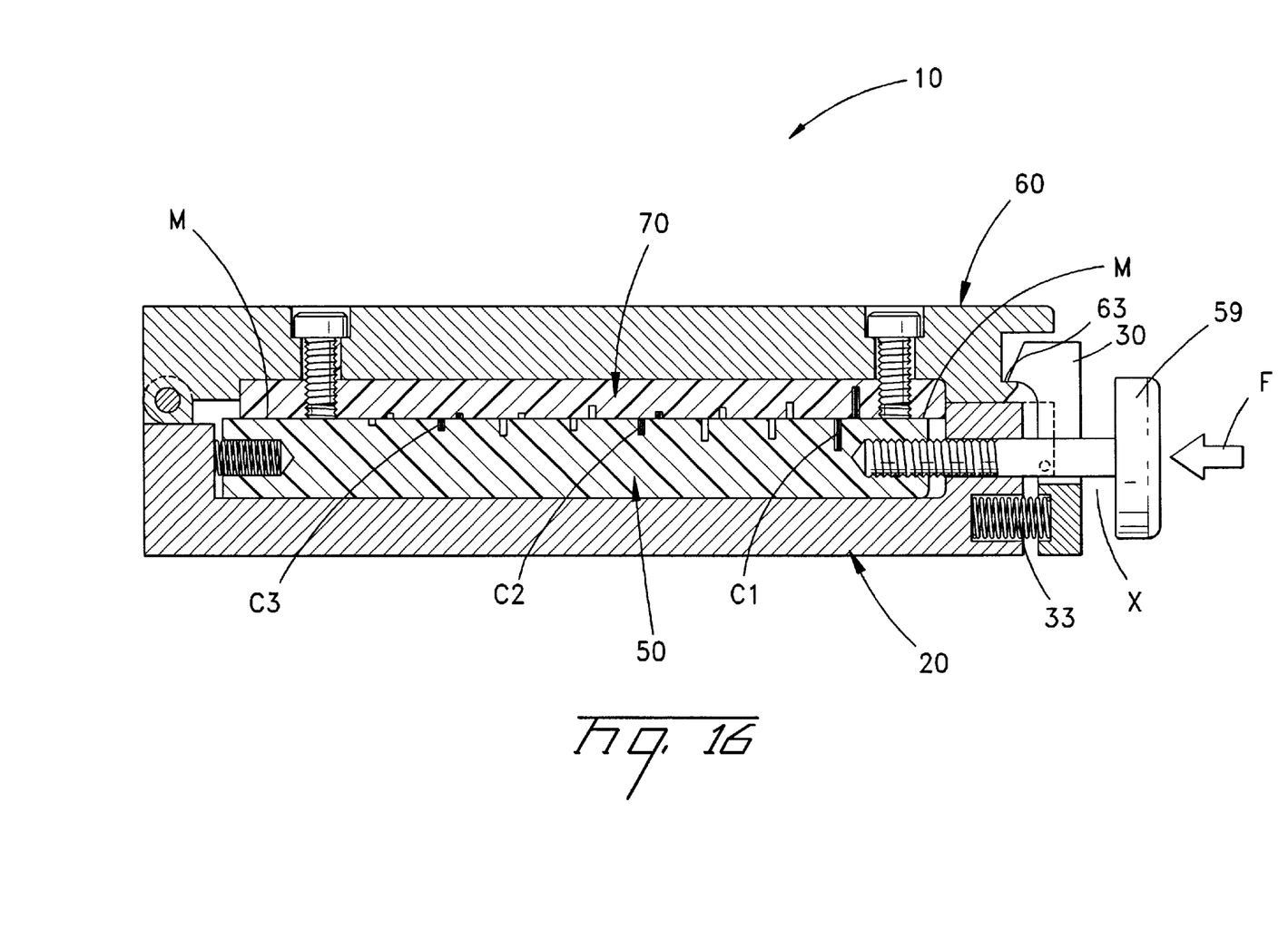
FIG. 16 is a cross sectional view, similar to FIG. 15 showing the ribbon separation tool in the actuated position whereby the optical-fiber ribbons have been sheared, with the shearing device formed of a non-metallic material.
Figure 17:
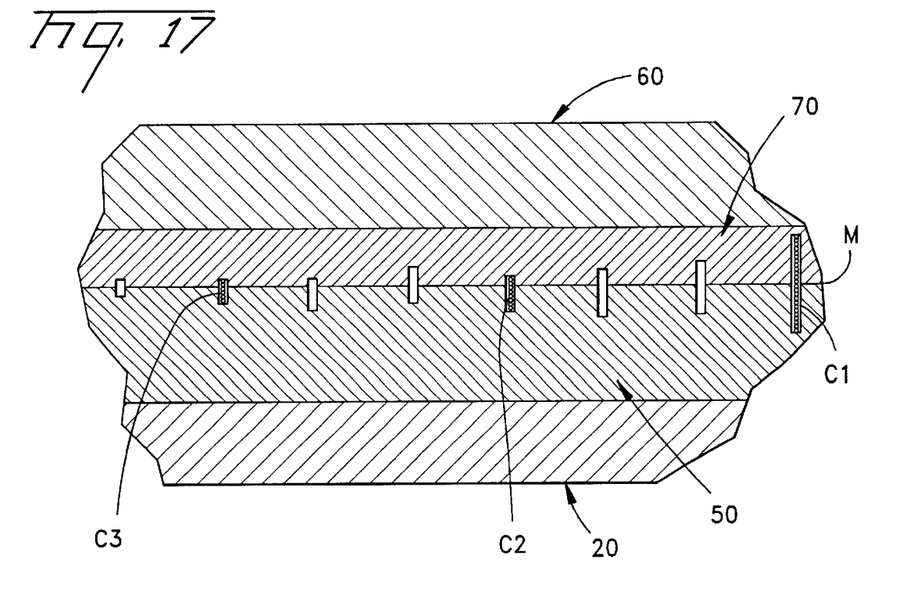
FIG. 17 is an enlarged sectional view showing a carrier of the ribbon separation tool in an initial position prior to shearing of the optical fiber ribbons.
Figure 18:
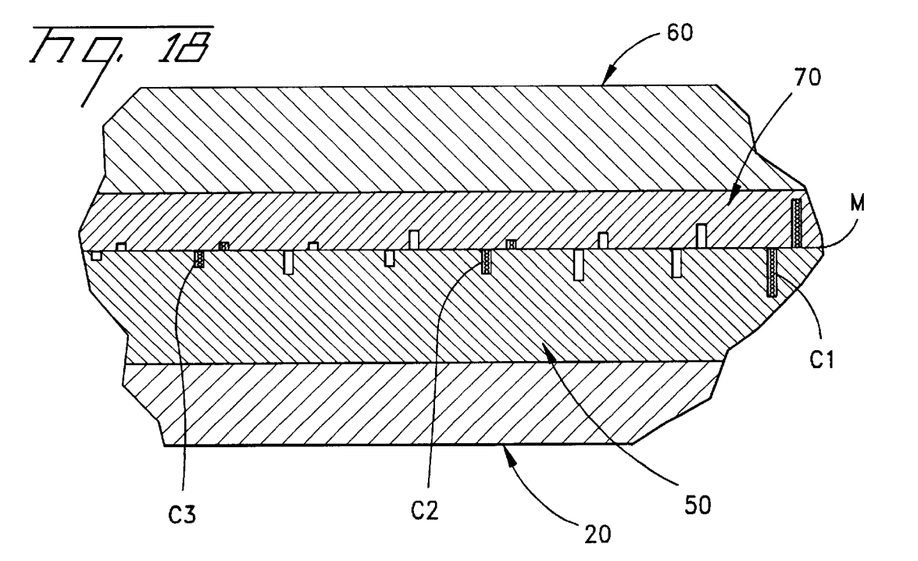
FIG. 18 is an enlarged sectional view showing the carrier in the actuated position whereby the optical fiber ribbons have been sheared.

Cover member 60, as shown in the exploded view of FIG. 4, includes a recess 62 therein for receiving a stationary shearing device 70 mountable to cover member 60 by fasteners 61. Cover member 60 includes a hinge structure comprising an extension 62 having an aperture 64 for hingeable connection of cover member 60 between shoulders 22 of base 20. Cover member 60 and base 20 include latching structures 30,63 for maintaining cover member 60 in a closed position (FIGS. 15–16). Latching structure 30 is hingeably attached to base 20 and is preferably biased by a coil spring 33 (FIGS. 15–16). Latch 30 acts as a biased, cam follower as it rides over camming surface 63a and latches automatically to cover member 60 as cover member 60 is moved to a closed position with respect to base 20.

Manufacture

In the most preferred of the invention, tool 10 is entirely made of metal parts, and shearing devices 50 and/or 70 are preferably monolithically formed of a metallic or a non-metallic material. In the most preferred embodiment, shearing devices 50,70 are each monolithically formed of respective blanks of tool-grade stainless steel.

Wire EDM

Figures 5, 6, 7, 7A, 7B:
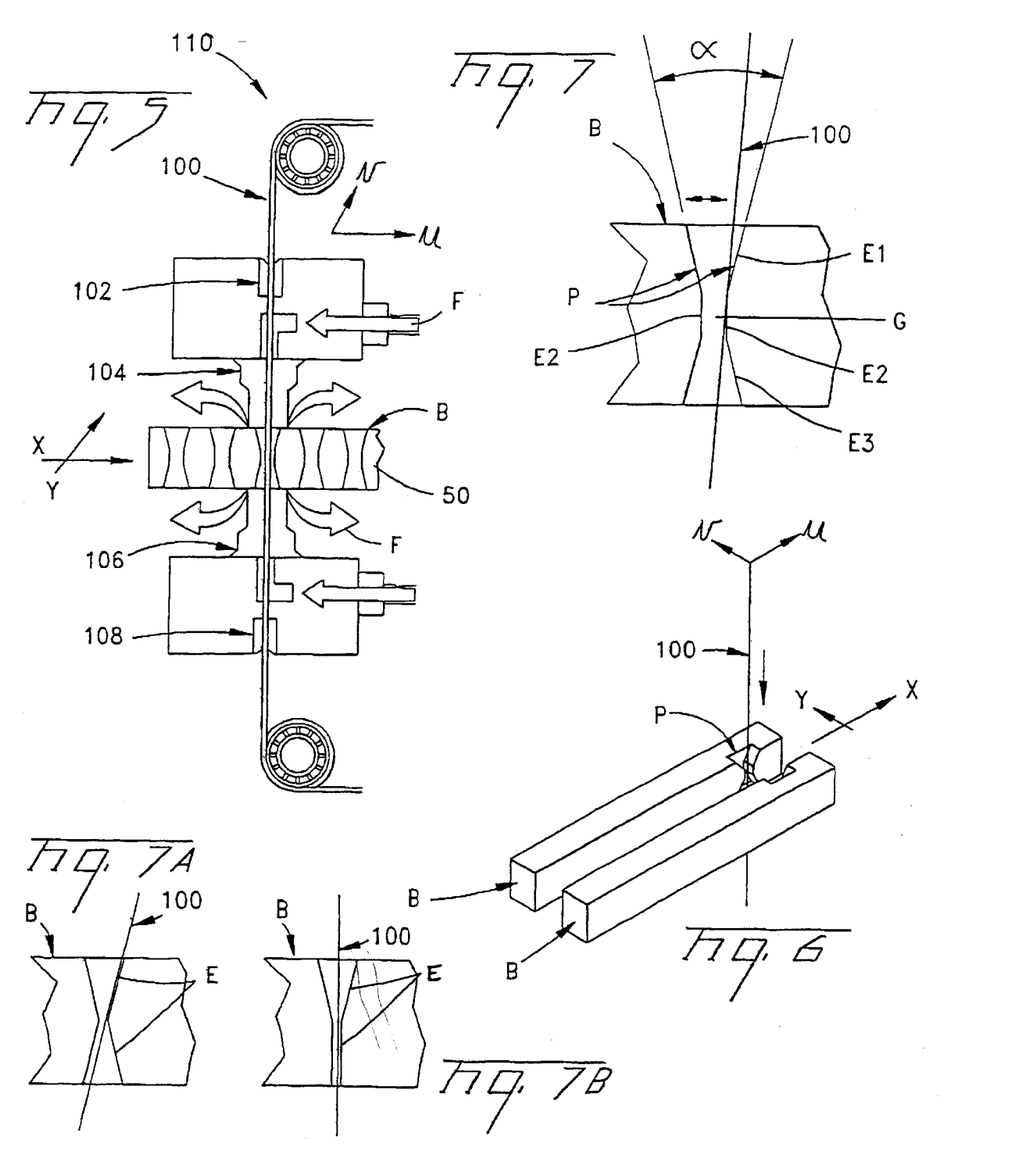
FIG. 5 is a schematic view of a wire EDM machine in the process of shaping shearing slots in a metal blank.
FIG. 6 is a partial isometric view of the wire EDM machine in the process of shaping shearing slots in two blanks adjacent to each other.
FIG. 7 is a partial view of a blank with the wire of the EDM machine cutting generally flat profiles therein.
FIG. 7A is a partial view of a blank having profiles with edges that generally form an apex.
FIG. 7B is a partial view of a blank having profiles with edges that generally form a lead-in angle and a gap.

The metal blanks can be shaped in an electric discharge machining (EDM) process, most preferably by a submersible wire EDM machine 110 (FIG. 5). Wire EDM machine 110 is preferably controlled by computer numerical control (CNC) tool fabrication software that interfaces with the EDM machine. Wire EDM machine 110 removes metal from blanks B by the creation of thousands of electrical discharges per second that flow between an electrode and the blanks, vaporizing the metal in a controlled area.

The submersible wire EDM process whereby blanks B are shaped into a shearing device will now be more particularly described (FIGS. 5–7). First, the desired shape of the shearing devices is drawn in a conventional computer aided drafting software package. Once the profile is drawn it is then imported into a computer aided machining (CAM) software package. The CAM software translates the profile into the required CNC code that EDM machine 110 will execute. The program is then checked in EDM machine 110 for possible errors before proceeding with the actual burn.

The three basic components in the preferred submersible wire EDM process are the electrode, i.e., a wire 100, a dielectric fluid, i.e., deionized water F, and a conductive work-piece, i.e., the metallic blanks B to be shaped into a shearing device (FIG. 5). The wire is preferably ten thousandths of an inch in diameter and is zinc-coated. Wire 100 can have, for example, a brass, molybdenum, or tungsten core. In the preferred method for making the shearing devices, two blanks B are held side by side on an X-Y table in a tank (not shown) full of dielectric fluid F as wire 100 is moved along axes u,v and burns profiles into each blank (FIG. 6). In this way, shearing device 50 is formed adjacent to shearing device 70. In the preferred process, the motion of wire 100 is controlled so that slots including at least one, but preferably two generally opposing shearing edge profiles P are formed in the blanks (FIG. 6). Each shearing edge profile comprises at least two edges E, but preferably three generally straight edges E1,E2,E3 (FIG. 7). The wire EDM process burns generally straight edges E1,E2,E3 along essentially straight lines. The generally straight edges E1,E2,E3 of a shearing edge profile P, taken together, do not define a true arc, but rather, the profile approximates an arc, for example, a preferred approximated arc of about a one-inch radius (FIG. 7). However, only two edges E need be formed to approximate an arc in a profile.

During the EDM process, wire 100 is moved by a movable guide 102 along axes u,v relative to a stationary guide 108 (FIGS. 5–6). As wire 100 is continually moving and burning the metal, and to remove metal particles, dielectric fluid F flushes the surface of blank B with flush ports 104,106. Wire 100 is controlled using the CNC control and preferably burns a lead-in angle α of between about 8° or less to about 25° or more, and most preferably about 16° (FIG. 7). In the preferred embodiment, slots 51,52,71,72 include profiles P having at least two generally parallel edges E2 defining a gap G of about 20 thousandths of an inch. Alternatively, a shearing edge profile can include at least two edges E1,E2 that approximate an arc by, for example, forming a shearing apex (FIG. 7A) or defining a shearing gap and a lead-in angle (FIG. 7B).

Controlled by the CNC program, wire 100 makes a rough-cut of profiles P with a large offset. The offset is a distance the wire travels parallel from the ultimately desired shape of the profiles, and avoids burning too far into the blanks. After the rough cut, the CNC program reduces the offset amount and the power thereby executing skin burns on the profiles, and honing the desired shape of the slots. When one set of profiles is complete, wire 100 is moved in the u,v axes, and blanks B are moved in the x,y axes, so that wire 100 is positioned to burn the next set of slots. The wire EDM process is preferably repeated on the blanks until all the slots are defined and the shearing devices are complete. Other machining of a shearing device, e.g., the formation of a recess 58 (FIG. 14), can occur before or after the wire EDM process.

There are machining methods that can be used in conjunction with, or in lieu of, the preferred submersible wire EDM approach. For example, a sinker EDM machine can be used. The sinker EDM would require the formation of at least one sinker electrode, a replica of the shearing device to be formed. The replica can be formed out of, e.g., graphite or copper tungsten. In a preferred embodiment, the sinker electrode would be shaped so that the shearing profiles P of the shearing devices 50,70, that correspond to, for example, edges E1,E2,E3 of the wire EDM machine part (FIG. 6), would preferably have true, rather than approximated, radii, for example one inch radius arcs. Alternatively, by appropriately shaping the sinker electrode, shearing devices 50,70 can be formed with edges E1,E2,E3 (FIG. 6) that approximate arc with generally straight edges. Controlled by a CNC controller to move in a pre-programmed path, the sinker electrode is operative to burn the slot shape into a shearing device blank B. It is preferable that several sinker electrodes be made. A first sinker electrode for the rough cut of all profiles simultaneously, and second and third sinker electrodes for more finely burning in the profiles. The sinker electrode will require oil instead of deionized water as the dielectric fluid. In addition, it is contemplated that the shearing devices can be partly machined on a milling machine and partly wire EDM machined. A laser cutting machine can be used as well.

Molding

As an alternative to the preferred all-metallic embodiment, tool 10 can be wholly or partially formed of non-metallic parts. For example, shearing devices 50,70 can be monolithically made of a suitable plastic or epoxy resin material in, for example, an injection molding or casting process. As an illustration, FIG. 16 shows shearing devices 50,70 formed of a plastic material. The injection mold die will preferably be a multi-cavity mold including suitably shaped cavities therein whereby sets of shearing devices 50,70 can be injection molded at the same time. Preferably, the die surfaces are polished to define shaped shearing edges and the gates of the injection mold will be located away from the slots so that uniform shearing edges can be formed. In a preferred embodiment, the shearing profiles P of the plastic or epoxy molded shearing device 50,70, that correspond to edges E1,E2,E3 of the wire EDM machine part (FIG. 7), would preferably have true, rather than approximated, arcs, for example one-inch radius arcs. Alternatively, by appropriately making the die mold, the plastic or epoxy molded shearing device 50,70 can be formed with edges E1,E2,E3 (FIG. 6) that approximate and arc with generally straight edges. The preferred engineering plastic for injection molding of shearing devices 50,70 includes, most preferably, polyetherimide. Other suitable engineering plastics include polyethersulfone, polysulfone, liquid crystal polymers, polycarbonate, polyvinylcholride, polyethylene, and polystyrene. The foregoing engineering plastics have good dimensional stability up to high temperatures and have a suitable hardness. For example, the plastics can have a Rockwell hardness of about M69, e.g., for polysulfone, to about R123, e.g., for polyethersulfone. Preferably the engineering plastic can be machined if necessary. To enhance mechanical properties, the engineering plastics can include suitable additives and/or fillers, for example, glass fillers.

The shearing devices of the present invention can be formed of other non-metallic materials, e.g., an epoxy resin, in a casting or transfer molding process. Suitable exemplary epoxy resins are readily processable, for example, bisphenol-A epoxy resins and epoxy-novolac resins. The epoxy resins can include fillers, for example, silica or aluminum oxide. Hardness of the epoxy resins can range between about 50 to about 90 on the Shore hardness D scale.

Operation of the Tool

Figure 8A:
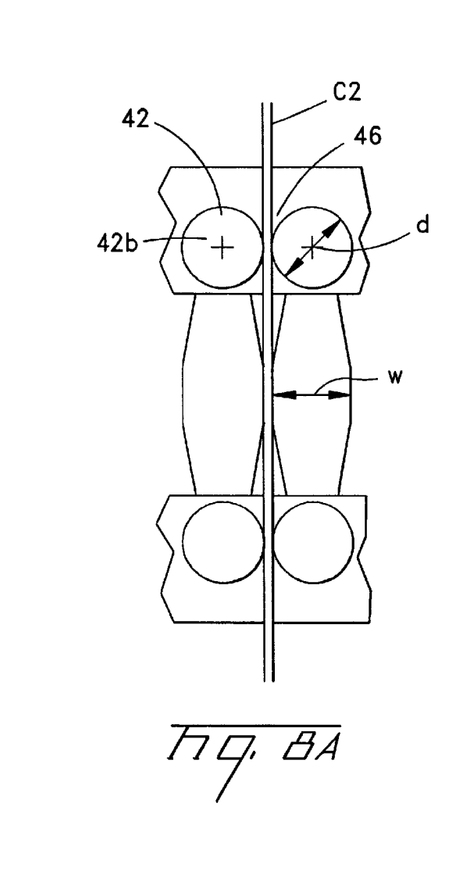
FIG. 8A is top view of the ribbon separation tool of FIG. 4 with cal fiber ribbon positioned to be sheared.

Optical fiber ribbons, for example, exemplary optical fiber ribbons C1,C2,C3 can be simultaneously inserted into respective slots 46 (FIG. 8). In a preferred embodiment of the present invention, ribbon separation tool 10 is, for example, capable of simultaneously separating up to eight optical fiber ribbons into respective subsets in a single shearing stroke. At least one side 21 of base 20 is preferably provided with indicia I that identifies the subsets into which the optical fibers may be separated. In the preferred embodiment, upon full insertion a ribbon will be disposed adjacent to and between generally parallel sides E2, and between respective support elements 42 (FIG. 8A). For sufficient aligning and guiding of a ribbon, the width w between slots 46 is roughly the same as or slightly larger than diameter d of element 42 (FIG. 8A). FIG. 9 shows ribbons C1,C2,C3 after they have been partially separated by ribbon separation tool 10 such that each optical fiber ribbon has been, in accordance with indicia I, separated into two subsets; for example, ribbon C1 has been separated into two 12-fiber subsets, ribbon C2 has been separated into 2-fiber and 6-fiber subsets, and ribbon C3 has been separated into 2-fiber and 4-fiber subsets.

Figure 10:
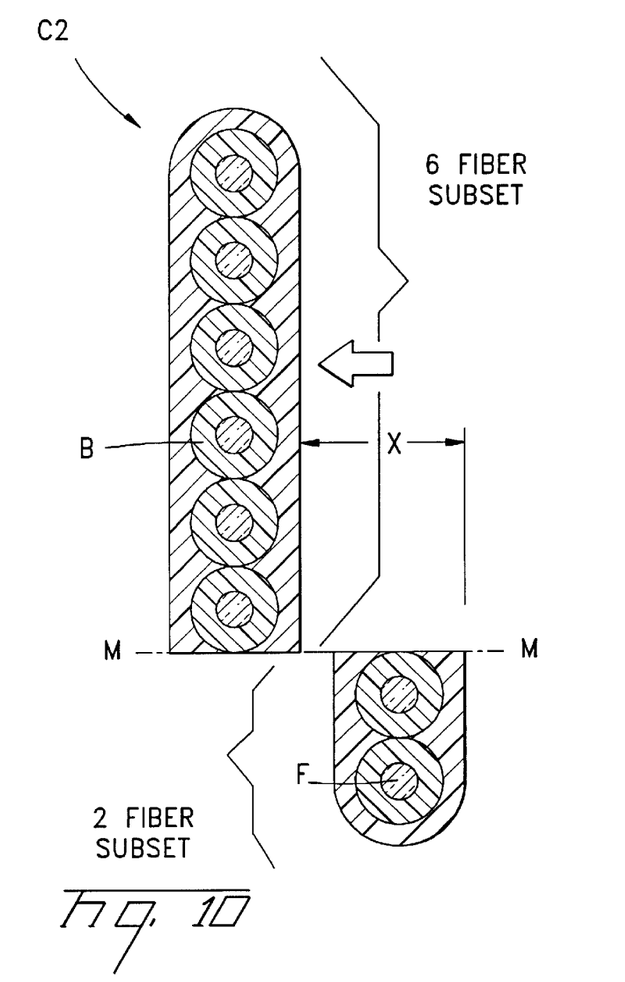
FIG. 10 is an enlarged sectional view of a separated optical fiber ribbon.

Ribbon separation tool 10 advantageously has an easily adjustable shearing stroke, the stroke of ribbon separation tool 10 can be varied to accommodate wear of shearing edges and/or optical fiber ribbons having variations in their respective thicknesses. Referring to FIG. 11, moveable shearing device 50 is separated from end wall 26 by a certain distance that represents a maximum shearing stroke distance (FIGS. 8–9). Set screw 31 is rotatably adjustable for defining a variable distance X (FIGS. 10–12). Set screw 31 delimits the shearing stroke distance by stopping the advance of device 50 (FIG. 12). Rotation of set screw 31 can be accomplished manually with the use of a tool. The shearing stroke of ribbon separation tool 10 can be adjusted to compensate for optical fiber ribbons manufactured with differing thicknesses, different lead-in angles formed in the shearing devices, and worn shearing edges. In another aspect of the invention, free and complete movement of moveable shearing device 50 during the shearing stroke is assured by the protection of the space between base 20 and cover member 60 from the entry of foreign matter, such protection being afforded at least by cover member 60, support elements 42, end wall 26, and sides 21.

As noted above, ribbon separation tool 10 may advantageously simultaneously separate a plurality of optical fiber ribbons with a single shearing stroke, and, moreover, tool 10 may form different optical fiber subsets. When cover member 60 is in a closed position, stationary sub-slots 71,72 are aligned with corresponding moveable sub-slots 51,52 to define respective shearing slots 51;71 and 52;72 each having 4 shearing stations (FIG. 15). Each shearing station is capable of receiving a respective optical fiber ribbon therein. Shearing slots 51;71 and 52;72 each straddle a shearing plane M defined between moveable shearing device 50 and stationary shearing device 70 (FIG. 15). The respective shearing slots 51;71 and 52;72 are sized to respectively receive optical fiber ribbons with the respective widths of the slots being preferably about 0.50–0.75 mm in width. This width range is preferable because it avoids fiber breakage and binding of the fibers and/or matrix material during the shearing stroke, and results in the desired number of optical fibers per subset.

For example, shearing plane M transects ribbons C1,C2, C3, between optical fibers thereof, and at respective locations between the sub-slots where the ribbons are to be separated, as exemplified by ribbon C2 shown in FIG. 15. However, to form exemplary optical fiber subsets in ribbons C1,C2,C3, the ribbons are longitudinally spaced along shearing plane M. To form numerically different subsets, ribbons C2 and C3 are unequally divided by shearing plane M. For example, as shown in FIG. 15, ribbons C1,C2,C3 are spaced along and divided by shearing plane M such that, when tool 10 is actuated: ribbon C1 will be separated into two 12-fiber subsets; ribbon C2 will be separated into one 2-fiber and one 6-fiber subset; and ribbon C3 will be separated into one 2-fiber subset and one 4-fiber subset.

Referring to FIGS. 15–18, actuation of ribbon separation tool 10 will be further described. At the start of the ribbon separation cycle, and as described above, exemplary optical fiber ribbons C1,C2,C3 are aligned with respective slots 46 and are then inserted through ribbon separation tool 10, e.g. as exemplified by ribbon C2 (FIG. 11). A pushing force F is applied to pusher member 59 (FIG. 12), that causes moveable shearing device 50 to move to an actuated position relative to stationary shearing device 70. As this occurs, moveable sub-slots 51,52 are moved out of alignment with stationary sub-slots 71,72 whereby ribbons C1,C2,C3 are sheared into optical fiber subsets (FIGS. 15–18). While maintaining pusher member 59 in the actuated position, optical fiber ribbons can be pulled through tool 10 in the direction they were inserted, or are withdrawn from the shearing stations opposite to the direction of insertion (FIG. 13). When pulled through or withdrawn from tool 10, the ribbons are separated lengthwise. The arcuate or approximated arc shearing edge profiles advantageously permit a ribbon to be separated in either direction of removal from tool 10 without damage to the matrix or optical fibers. In the preferred embodiment, actuation of tool 10 results in the formation of subsets of 2, 4, 6, 8, 10, and 12 fibers each suitable for connectorization. Pusher member 59 is then released and spring 28 is operative to move moveable shearing device 50 and pusher member 59 back to their initial positions. One complete cycle of ribbon separation tool 10 has thus been completed. If desired, some of the optical fiber subsets may be again sheared to form smaller optical fiber ribbon subsets.

The present invention has been described with reference to the foregoing embodiments, which embodiments are intended to be illustrative of the present inventive concepts rather than limiting. Persons of ordinary skill in the art will appreciate that variations and modifications of the foregoing embodiments may be made without departing from the scope of the appended claims. Although the present invention has been described with reference to a manually operated ribbon separation tool, the tool of the present invention can be incorporated into a machine or optical fiber splicing unit. For example, pusher member 59 may be operatively connected to an electric motor, or a hydraulic or pneumatic cylinder, and tool 10 actuated accordingly. Tool 10 can include a combination of one non-metallic and one metallic shearing device. In addition, the entirety of tool 10 can be formed of non-metallic parts in a molding or casting process, for example, using filled or non-filled engineering plastics or epoxy resins. The hinge between base 20 and cover 60 could be a web of plastic connecting the covers together. Furthermore, although the present invention has been described with reference to moveable and stationary shearing devices, the present invention may be adapted to have both shearing devices move in opposing directions during the shearing stroke. The present invention may be adapted to form numerically different subsets than those described above, with more or less shearing stations.

Accordingly, what is claimed is:

1. A ribbon separation tool, comprising:
   at least two shearing devices, at least one of said shearing devices being an essentially linearly acting, movable shearing device operative to move along a shearing stroke relative to the other of said shearing devices, said shearing stroke describing an essentially linear line of action;
   said shearing devices cooperating to define at least one shearing station comprising a shearing slot;
   said shearing slot comprising at least one shearing edge profile,
   said shearing edge profile comprising at least two generally straight edges that approximate an arc.

2. The ribbon separation tool of claim 1, said shearing slot comprising at least two opposing shearing edge profiles each having at least two respective generally straight edges.

3. The ribbon separation tool of claim 2, at least two of said generally straight edges defining an angle of about 8° to about 25°.

4. The ribbon separation tool of claim 2, at least two of said generally straight edges being generally parallel with respect to each other defining a shearing gap therebetween.

5. The ribbon separation tool of claim 1, said at least one shearing edge profile being burned into said shearing devices by an electrode that forms said generally straight edges.

6. The ribbon separation tool of claim 1, at least one of said shearing devices being monolithically formed of a single piece of material and including said shearing edge profile.

7. The ribbon separation tool of claim 6, said material being a tool-grade steel.

8. The ribbon separation tool of claim 6, said material being a non-metallic material.

9. The ribbon separation tool of claim 6, said material being selected from the group consisting of polyetherimide, polyether sulfone, polysulfone, liquid crystal polymers, polycarbonate, polyvinylcholride, polyethylene, and polystyrene.

10. The ribbon separation tool of claim 6, said material being an epoxy resin.

11. The ribbon separation tool of claim 6, said material selected from the group consisting of bisphenol-A epoxy resins and epoxy-novolac resins.

12. The ribbon separation tool of claim 1, said at least two generally straight edges that approximate an arc defining a shearing apex.

13. A ribbon separation tool, comprising:
    at least two shearing devices, at least one of said shearing devices being an essentially linearly acting, movable shearing device operative to move along an essentially linear line of action in a shearing stroke relative to the other of said shearing devices, and at least one of said shearing devices being monolithically formed of a single piece of material;
    said shearing devices defining at least one shearing station comprising a respective shearing slot, at least part of said shearing slot being formed in said at least one monolithically formed shearing device, and said shearing slot comprising at least one shearing edge profile, said shearing edge profile comprising an arcuate shearing edge.

14. The ribbon separation tool of claim 13, said single piece of material being a molded, non-metallic material.

15. The ribbon separation tool of claim 14, said molded non-metallic material being selected from the group consisting of polyetherimide, polyether sulfone, polysulfone, liquid crystal polymer, polycarbonate, polyvinylcholride, polyethylene, and polystyrene.

16. The ribbon separation tool of claim 13, said material being an epoxy resin.

17. The ribbon separation tool of claim 13, said material selected from the group consisting of bisphenol-A epoxy resins and epoxy-novolac resins.

18. The ribbon separation tool of claim 13, said single piece of material being a tool-grade metal.

19. The ribbon separation tool of claim 13, said shearing edge profile being burned into said at least one monolithically formed shearing device by an electrode.

\* \* \* \* \*